(12) United States Patent
Reijersen Van Buuren

(10) Patent No.: US 8,322,119 B2
(45) Date of Patent: Dec. 4, 2012

(54) AGRICULTURAL SYSTEM TO FORM AND WRAP BALES OF CROP MATERIAL

(75) Inventor: Willem Jacobus Reijersen Van Buuren, Dirksland (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 13/303,278

(22) Filed: Nov. 23, 2011

(65) Prior Publication Data

US 2012/0060444 A1   Mar. 15, 2012

Related U.S. Application Data

(63) Continuation of application No. PCT/NL2010/000075, filed on May 6, 2010.

(30) Foreign Application Priority Data

May 29, 2009 (NL) ..................................... 1037000

(51) Int. Cl.
*A01F 15/07* (2006.01)
*B65B 11/04* (2006.01)

(52) U.S. Cl. .................. 53/587; 53/588; 53/210; 53/211

(58) Field of Classification Search ............ 53/116–118, 53/176, 587, 588, 210, 211; *B65B 63/04, B65B 11/04, 27/12; A01F 15/07*
See application file for complete search history.

(56) References Cited

U.S. PATENT DOCUMENTS

| 3,722,197 A | 3/1973 | Vermeer |
| 4,685,270 A * | 8/1987 | Brambilla ........................ 53/210 |
| 5,822,967 A | 10/1998 | Hood et al. |
| 6,405,510 B1 | 6/2002 | Viaud |
| 6,901,719 B2 * | 6/2005 | Viaud ............................... 53/211 |
| 7,156,015 B2 * | 1/2007 | McHale et al. .................. 100/89 |
| 7,166,808 B2 * | 1/2007 | Viaud et al. ...................... 53/502 |
| 2007/0081878 A1 * | 4/2007 | McHale et al. ............... 414/24.5 |
| 2008/0264031 A1 * | 10/2008 | McHale et al. .................. 53/211 |

FOREIGN PATENT DOCUMENTS

| DE | 3941727 A1 | * | 6/1991 |
| DE | 4208091 A1 | | 10/1993 |
| EP | 1048201 A1 | | 11/2000 |
| EP | 1077025 A1 | | 2/2001 |
| EP | 1138189 A2 | * | 10/2001 |
| EP | 1273218 A1 | | 1/2003 |
| EP | 2050330 A1 | * | 4/2009 |
| FR | 2658985 A1 | * | 9/1991 |
| GB | 2169551 A | | 7/1986 |
| JP | 2000326909 A | * | 11/2000 |
| JP | 2002160094 A | * | 6/2002 |

* cited by examiner

*Primary Examiner* — Stephen F Gerrity
(74) *Attorney, Agent, or Firm* — Coraline J. Haitjema; David P. Owen; Hoyng Monegier LLP

(57) ABSTRACT

The agricultural system includes a baling device having a bale forming mechanism to form a bale including a pivotable rear flap to open a baling chamber in which the bale can be formed, and a wrapping device to wrap the bale in wrapping material, the wrapping device including a wrapping table to support the bale during wrapping and wrapping mechanism. The wrapping mechanism has one or more movable parts that can be rotated during wrapping along a trajectory around the bale supported on the wrapping table. The wrapping device is partially located below the baling device, wherein the trajectory of the one or more moving parts of the wrapping device and a trajectory of the pivotable rear flap of the baling device are non-overlapping.

13 Claims, 5 Drawing Sheets

AGRICULTURAL SYSTEM TO FORM AND WRAP BALES OF CROP MATERIAL

CROSS-REFERENCE TO RELATED APPLICATIONS

This application is a continuation of PCT patent application No. PCT/NL2010/000075 filed on 6 May 2010, which claims priority from Netherlands patent application number 1037000 filed on 29 May 2009. Both applications are hereby incorporated by reference in their entireties.

BACKGROUND OF INVENTION

1. Field of Invention

The present invention relates to an agricultural system for forming and wrapping bales of crop material.

2. Description of related art

Different types of combined baling and wrapping devices are known. U.S. Pat. No. 5,822,967, which is hereby incorporated by reference in its entirety, discloses an agricultural unit comprising a baling device and a swing arm bale wrapping device. The baling device comprises bale forming means to form a bale in baling chamber. The baling device comprises a pivotable rear flap to open the baling chamber after formation of a bale in order to make removal of the bale from the baling chamber possible. After forming a bale, the bale is transferred to a wrapping device to wrap the bale in wrapping material, typically film material.

The wrapping device comprises a wrapping table to support the bale during wrapping and wrapping means, e.g. wrapping mechanism, to wrap the wrapping material on the bale. The wrapping mechanism comprises one or more movable parts to be rotated during wrapping around the bale supported on the wrapping table.

In the combination of U.S. Pat. No. 5,822,967, which is hereby incorporated by reference in its entirety, during the formation a bale, the wrapping device cannot be used for wrapping a wrapping material about a bale. Correspondingly, the baling device cannot be used during wrapping of a bale. During wrapping of a bale the rear flap of the baling device remains open. After the wrapping of a bale has finished and the wrapped bale has been dropped on the ground, the rear flap can be closed and the formation of a new bale be started.

Since the baling device and the wrapping device cannot be used at the same time, the throughput of the agricultural system of U.S. Pat. No. 5,822,967 is relatively low.

EP 1 077 025, which is hereby incorporated by reference in its entirety, discloses a similar agricultural unit combining a baling device and a wrapping device. The baling device and the wrapping device are mounted on a single frame. The wrapping device is located behind, and substantially on the same height as the baling device. Transfer means for transferring the bale from the baling device to the wrapping device are provided. These transfer means comprise two pivotable arms which as a result of a consecutive pivoting movement can displace the bale from the baling chamber to the wrapping device. After a bale is formed, the rear flap of the baling device is opened, and the bale is transferred towards the wrapping table of the wrapping device.

A drawback of the combined baling and wrapping device of EP 1077025, is that wrapping can only be started after that the pivotable rear flap of the baling device is closed. This has a negative influence on the cycle time of a single bale and on the overall throughput of the device.

Another drawback of the device of EP 1077025 is that the combination of baling device and wrapping device is relative long.

BRIEF SUMMARY OF THE INVENTION

The present invention addresses these problems by providing an agricultural system to form and wrap bales of crop material, wherein the combination of baling device and wrapping device may have a relative short length in the intended driving direction, and wherein the throughput of the system may be relative high.

According to various aspects of the present invention, the agricultural system comprises:

a baling device comprising bale forming means, e.g, bale forming mechanism, to form a bale including a pivotable rear flap to open a baling chamber in which the bale can be formed, and a wrapping device to wrap the bale in wrapping material, the wrapping device comprising a wrapping table to support the bale during wrapping and wrapping means, e.g. wrapping mechanism, the wrapping mechanism comprising one or more movable parts to be rotated during wrapping along a trajectory around the bale supported on the wrapping table, characterized in that the wrapping device is partially located below the baling device, wherein the trajectory of the one or more moving parts of the wrapping device and a trajectory of the pivotable rear flap of the baling device are non-overlapping.

The agricultural system according to the present invention allows the wrapping of a bale to directly start after the bale is received on the wrapping table, independent of the position of the rear flap of the baling device. Also, the formation of a new bale can directly be started after that the rear flap is closed independent of the wrapping process.

Further, the combination of baling device and wrapping device is relatively compact in the intended driving direction, as the wrapping device is located partially below the baling device.

It is remarked that a wrapping device which is only located under the rear flap in the open position of this rear flap is also regarded to be located below the baling device. According to one embodiment, the wrapping device is located at least partially under the baling device when the rear flap is in the closed position. In this configuration, a very compact configuration of the combination of baling device and wrapping device is obtained.

Further, it is remarked that, unless mentioned otherwise, terms referring to a relative position, such as above, below, tilted etc. are used to describe the positions of the parts of the agricultural system of the invention, while the agricultural position is in its normal upright position supported on a horizontal underground.

In one embodiment, a part of the trajectory of the one or more moving parts is located below the baling device. Since the trajectory of the one or more moving parts during wrapping is required to be non-overlapping with the trajectory of the rear flap between the open and closed position of the baling chamber, it is advantageous to place a part of the trajectory at the side of the baling device below the baling device to obtain a compact design. In this way the baling process and the wrapping process are made substantially independent, while keeping a compact design.

In another embodiment, the trajectory of the one or more moving parts is tilted with respect to a horizontal plane, wherein a lower part of said trajectory is located directed to a side of the baling device, preferably below the baling device. By tilting the trajectory of the one or more moving parts of the wrapping means with respect to a horizontal plane, the one or more moving parts may have a more suitable trajectory in relation with the trajectory of the pivotable rear flap of the baling device. The angle of the trajectory of the one or moving parts during wrapping is preferably 5 to 45 degrees, more preferably 10 to 30 degrees with respect to a horizontal plane, depending on the bale diameter.

In yet another embodiment, the wrapping mechanism comprises one or more roll support devices to support wrapping material rolls, and a carrying structure to carry the one or more roll support devices, wherein the carrying structure is arranged below the one or more roll support devices.

The height of the roll support devices is related to the height of the bale on the wrapping table in order to make wrapping of wrapping material on the bale possible. By providing a wrapping device in which the carrying structure of the roll support devices is arranged below the roll support devices, the roll support devices are arranged at the top side of the wrapping device, and as a result, the height of the wrapping device can be kept relatively low with respect to the ground.

This is advantageous as according to the invention the wrapping device is located partially below the baling device resulting in a compact design.

Preferably, gravity is used to transfer the bale from the baling chamber to the wrapping device. By using gravity to displace the bale from the baling device to the wrapping device, any interference between moving parts of an active displacement device, such as the movable arms of EP 1077025, which is hereby incorporated by reference in its entirety, and the one or moving parts of the wrapping device and/or the pivotable rear flap is avoided. Such interference may have a negative influence on the throughput of the agricultural system. Furthermore, since the wrapping device is located at a lower level than the baling device, the bale has sufficient potential energy to displace from the baling device to the wrapping device.

In an embodiment, the agricultural system comprises transfer means, e.g. a transfer mechanism, to transfer the bale from baling chamber to the wrapping table, wherein the transfer mechanism comprises a guiding slope to guide the bale from the baling chamber to the wrapping device. In such embodiment the actual movement of the bale may be created by gravity.

In a further embodiment, the baling device and wrapping device are mounted on a single frame supported by a set of wheels to form an agricultural unit for forming and wrapping bales of crop material. Such agricultural unit provides a single device of compact design to form and wrap bales of crop material having a high throughput.

In yet another embodiment, the baling device and wrapping device are mounted on separates frames each supported by a set of wheels, at least during use of the agricultural system, the frames being connected to each other. In such embodiment, the baling device is at least partially located above the wrapping device, when the frames are connected to each other. When the combination is not used, the baling device and the wrapping device may be uncoupled. It will be clear that in the uncoupled state the wrapping device does not have to be partially located under the baling device.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
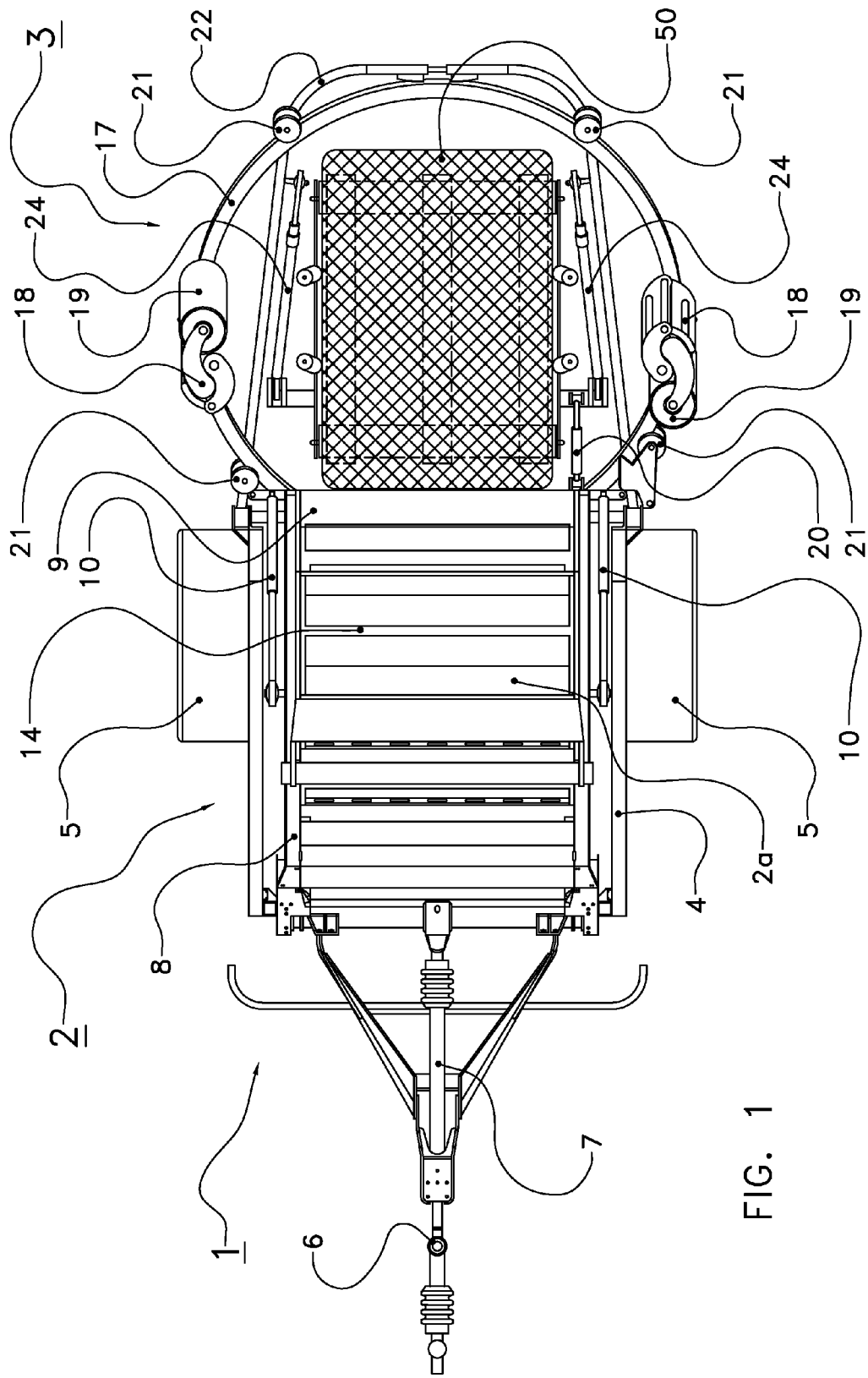
FIG. 1 shows a top view of an agricultural unit according to an embodiment the invention.

The following is a description of certain embodiments of the invention, given by way of example only and with reference to the drawings. Referring to FIG. 1, it shows, in top view, an agricultural unit according to the invention which is generally indicated with the reference numeral 1. The agricultural unit 1 comprises a baling device 2 and a wrapping device 3, and is configured to form and wrap bales of crop material. FIGS. 2 to 5 show side views of the agricultural unit 1 of FIG. 1 in different states of the baling and wrapping process, as will be described hereinafter.

The baling device 2 and the wrapping device 3 are mounted on a frame 4 which is supported by a pair of wheels 5. The front end 6 of the frame 4 is configured to be connected to a tractor, or other machinery configured to move the agricultural unit in an intended driving direction, indicated by an arrow A. A drive shaft 7 is provided to couple the agricultural unit 1 to a drive mechanism, for instance a drive shaft of a tractor.

The wrapping device 3 is partly located below the baling device 2 to obtain a compact design.

The baling device 2 comprises a stationary part 8 and a pivotable rear flap 9. The pivotable flap is pivotable about a pivot point arranged at the top side of the stationary part 8 and the pivotable rear flap 9. A hydraulic cylinder 10 is provided to pivot the rear flap 9 between an opened and a closed position. During movement of the pivotable flap 9 between the closed and opened position, the pivotable rear flap follows the trajectory 11.

The baling device 2 further comprises a locking arm 12 which is configured to hold the stationary part 8 and the pivotable rear flap 9 together when the pivotable rear flap 9 is in the closed position. A hydraulic cylinder 13 is provided to move the locking arm 12 between a locking position in which the stationary part 8 and the pivotable rear flap 9 are held together, and a non-locking position wherein the pivotable rear flap 9 is not prevented to pivot to its opened position.

The baling device 2 comprises a baling chamber 14 in which the bale 50 may be formed by use of baling means 2a comprising rolls and bands to rotate and press the crop material to form a bale 50. The baling chamber 14 is a variable baling chamber configured to form round bales of crop material of different diameters, for instance 80, 100, 130 and 160 cm in diameter. For further details on an embodiment of a baling device having a variable baling chamber reference is made to U.S. Pat. No. 3,722,197, which is hereby incorporated by reference in its entirety. Other types of baling devices having a variable baling chamber may also be applied. As an alternative the baling chamber 14 may be configured to form bales with constant diameter.

The wrapping device 3 is configured to wrap a bale 50 in wrapping material, typically plastic film material provided on rolls. The film material is wrapped about the bale 50 to cover the outer surface of the bale 50.

The wrapping device 3 comprises a wrapping table 15 which supports the bale 50 during wrapping and a wrapping means 16. The wrapping table is configured to rotate the supported bale 50 about its cylindrical axis during wrapping.

The wrapping table 15 is pivotable about pivot axis 15*a* between different positions. A hydraulic cylinder 20 is provided to pivot the wrapping table 15 between the different positions.

Figure 2:
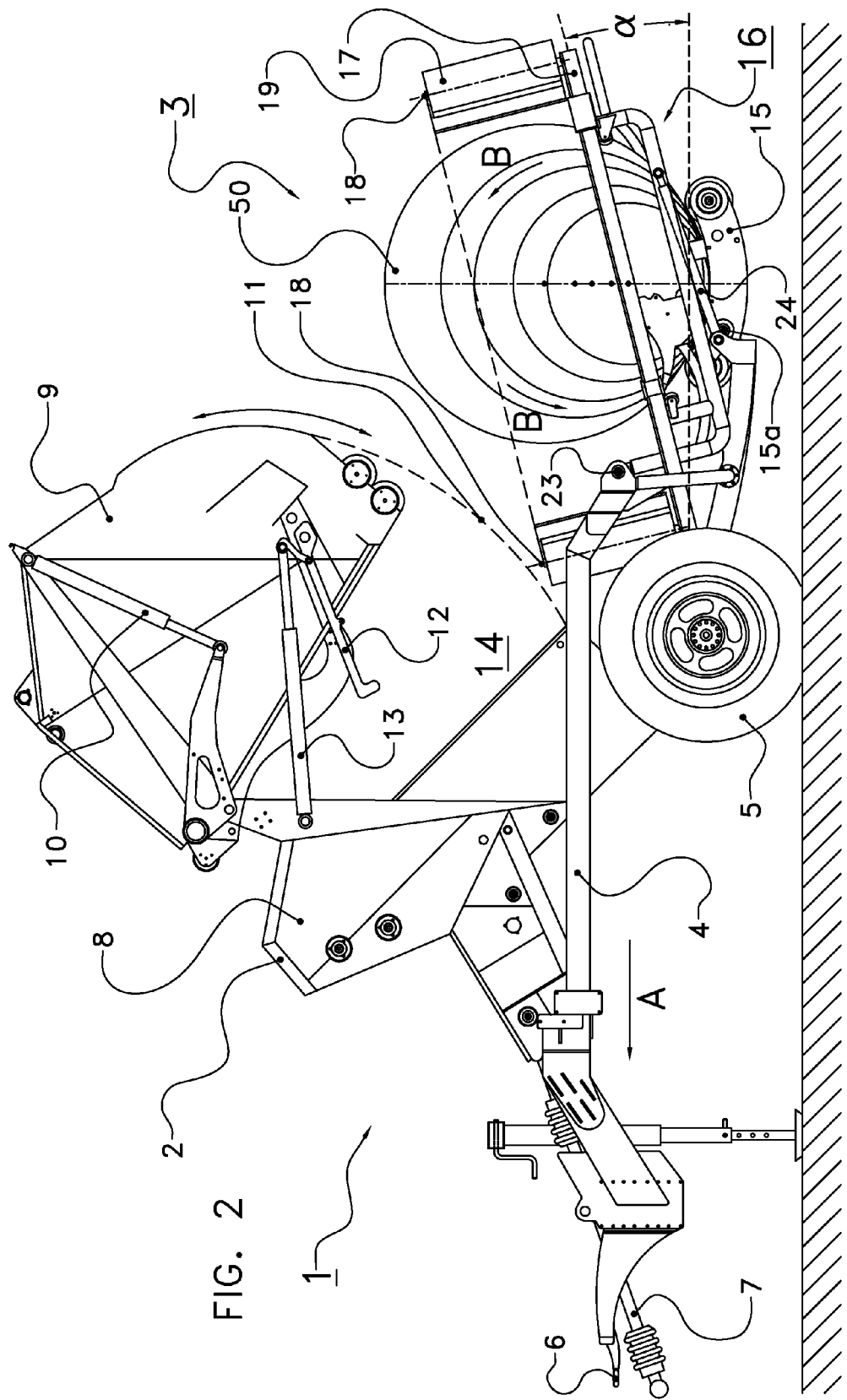
FIG. 2 shows a side view of the agricultural unit of FIG. 1 during wrapping of a bale.
Figure 3:
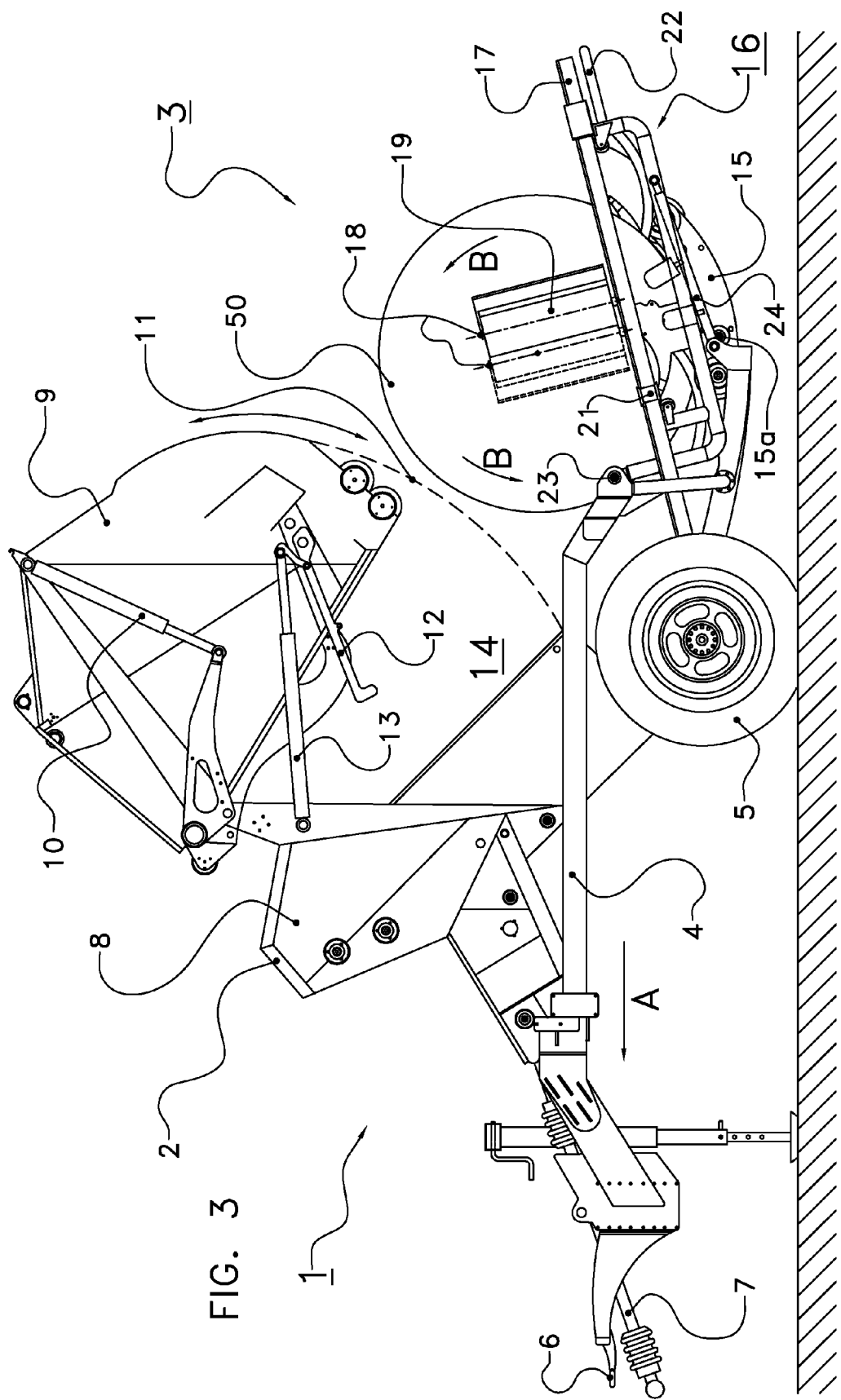
FIG. 3 shows a side view of the agricultural unit of FIG. 1 after receipt of a bale on the wrapping table.
Figure 4:
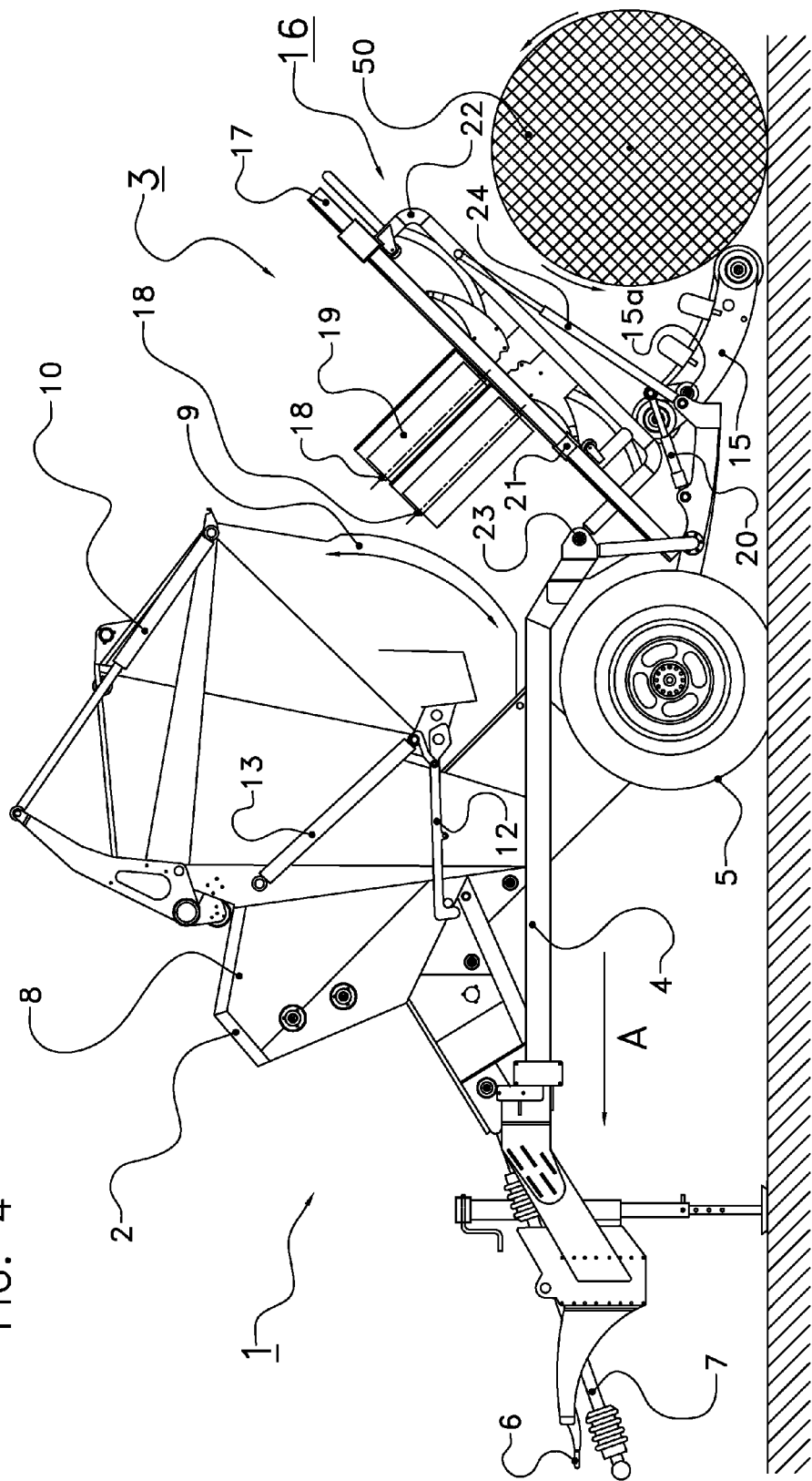
FIG. 4 shows a side view of the agricultural unit of FIG. 1 after dropping a bale on the ground.
Figure 5:
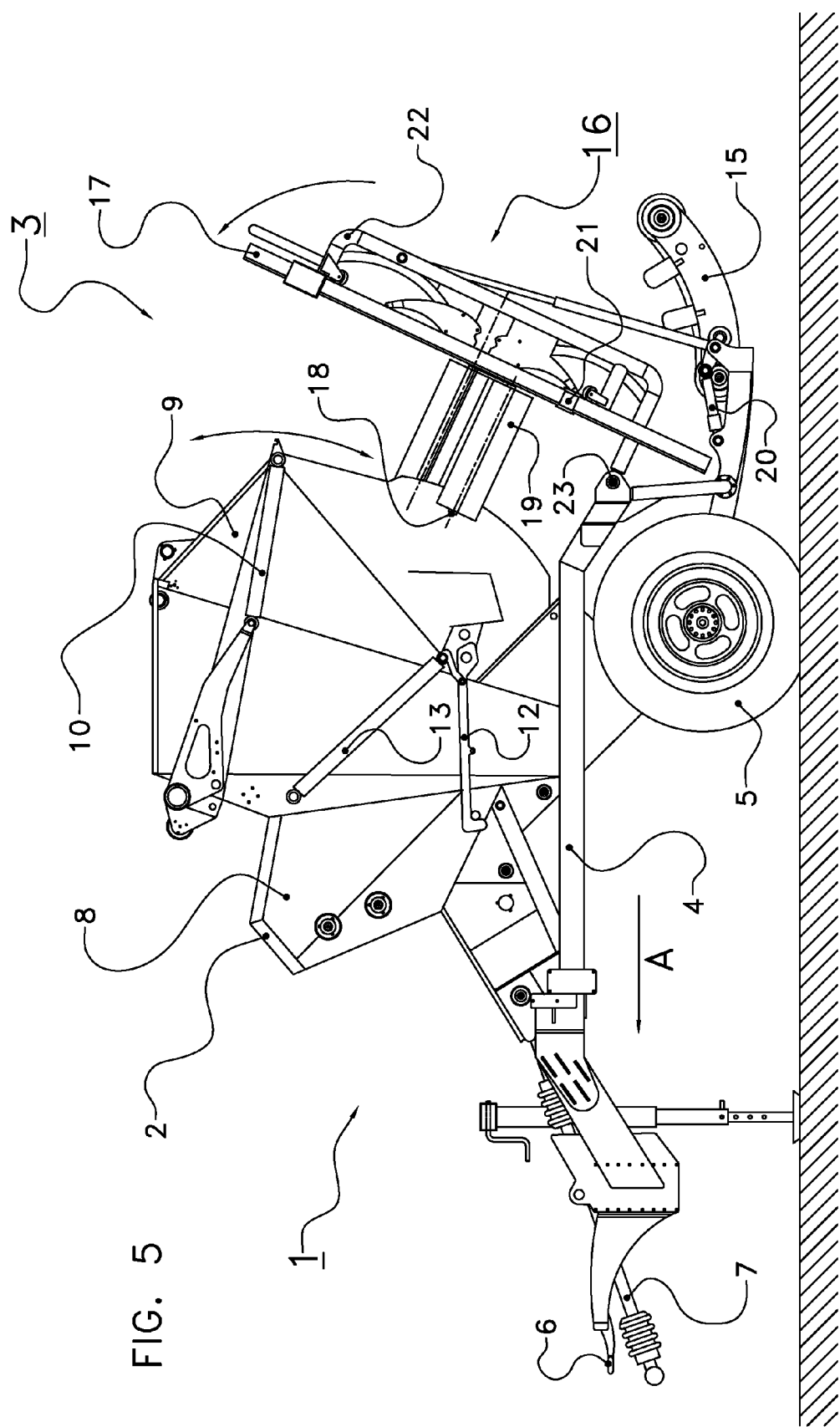
FIG. 5 shows a side view of the agricultural unit of FIG. 1 in transport position.

The wrapping table 15 can be placed in a receiving position (FIG. 3) to receive a bale 50 from the baling chamber 14. This position also corresponds or substantially corresponds with a transport position as shown in FIG. 5. During wrapping the wrapping table 15 is placed in the wrapping position as shown in FIG. 2. When a bale 50 is wrapped and to be released from the wrapping device 3, the wrapping table is brought into the release position as shown in FIG. 4.

In the wrapping position the wrapping table is positioned in an angle of 0 degrees with the horizontal plane. In the receiving position the wrapping table 15 is pivoted 20 degrees towards the baling device 2, while in the release position the wrapping table 15 is pivoted 20 degrees away from the baling device 2.

The wrapping means 16 comprises a ring 17 supporting two roll support devices 18 each configured to support a roll of wrapping material 19. The ring 17 is movably supported by a number of rollers 21 mounted on a carrying structure 22. The ring 17 is rotatable during wrapping in order to move the rolls of wrapping material 19 about the bale 50 supported on the wrapping table 15. The carrying structure 22 is mounted under the ring 17.

The wrapping means may further comprise a non-shown clamping and cutting device to clamp and cut the wrapping material between the bale 50 and the rolls of wrapping material 19 at the end of the wrapping of the bale 50.

The wrapping means are arranged at an inclination angle with respect to the horizontal plane, whereby the part below the baling device 2 is the closest to the ground. As a result the trajectory of the moving parts of the wrapping device 3, such as the rotatable ring 17 and roll support devices 18 is also inclined with the angle $\alpha$ with respect to the horizontal plane.

During wrapping the angle $\alpha$ will be in the range 5 to 45 degrees, preferably between 10 to 30 degrees.

The wrapping means 16 can be rotated with respect to the frame 4, since the carrying structure 22 is pivotably mounted on a pivot axis 23 which is arranged parallel to the pivot axis 15*a*. A hydraulic cylinder 24 is provided to pivot the carrying structure 22 between different positions. The carrying structure 22 is at least pivotable between a wrapping position in which the wrapping means 16 are positioned to wrap a bale 50 supported on the wrapping table 15, as shown in FIG. 2, a release position, wherein a bale 50 can pass through the ring 17 in order to be released from the wrapping device 3, as shown in FIG. 4, and a transport position, wherein the wrapping means are brought in a position suitable for transport of the agricultural unit, as shown in FIG. 5.

In the release position and the transport position the angle may be 40 to 90 degrees with respect to a horizontal plane, preferably 50 to 70 degrees.

The top of the trajectory of the wrapping means, in particular of the tops of the roll supporting devices 18 is indicated with a dashed line in FIG. 2. This trajectory of the roll supporting devices 18 during wrapping does not overlap with the trajectory 11 of the rear flap 9 of the baling device 2. As a result, the wrapping process can be started independent of the position of the rear flap 9 of the baling device 2, i.e. wrapping can be started before baling. Also, the rear flap 9 can be brought to the closed position in order to start the formation of a new bale 50 independent of the wrapping process.

Thus, the agricultural unit 1 is not only of relative compact design, but the baling process and the wrapping process can also be carried out substantially independent of each other. It is also possible to form a bale 50 and wrap a previously formed bale 50 simultaneously at substantially the same time.

In this respect, it is remarked that in the wrapping position of the wrapping means 16, the wrapping means 16 are located at the angle $\alpha$ with respect to a horizontal plane which is suitable for wrapping, but at the same time is advantageous in view of the trajectories of the rear flap 9 of the baling device 2 and the roll support devices 18 of the wrapping device 3, which trajectories according to the invention do not overlap.

Now will be described how a bale 50 may be formed and wrapped in a agricultural unit 1 according to the invention.

To form a bale 50 of crop material, the baling device 2 comprises a pick-up device (not shown) for picking crop material from an underground over which the agricultural unit 1 is moved. The crop material is introduced into the baling chamber 14 to form a bale 50 of crop material by pressing and rotating the crop material into a cylindrical form until a bale 50 of the desired diameter is formed.

One of ordinary skill in the art will appreciate that pick up devices are well known in the art. A baler is provided with a rotary driven pick-up that comprises an elongate drum that is oriented transversely to the direction of travel. The drum comprises a large number of so-called tine arms that extend away from the drum and pick-up crop material from the ground as they are driven in rotation. Located downstream of the pick-up is a large rotor that chops the crop material into smaller pieces and takes care of transporting the material towards the bale chamber. Such pick-up devices are known from for example GB2169551 and EP1273218 both references of which are hereby incorporated by reference in their entireties.

Since considerable forces are used to form the bale 50 in the baling chamber 14, the locking arm 12 is held in the locking position to hold the stationary part 8 and the pivotable rear flap 9 together.

When a bale 50 of a desired diameter has been formed the baling process is stopped and the pivotable rear flap 9 is opened to release the bale 50 from the baling chamber 14. For opening of the baling chamber the locking arm 13 is brought into the unlocked position.

Due to gravity, the bale 50 will roll from the baling chamber 14 towards the wrapping table 15 which is placed in the receiving position to receive the bale 50. FIG. 3 shows the agricultural unit wherein the wrapping table just received a bale 50 from the baling chamber 14 with the wrapping table 15 in the receiving position.

It is remarked that the supporting surface of the wrapping table is located at a lower level than the bottom side of the baling chamber 14 so that the bale 50 can roll from the baling chamber 14 to the wrapping table 15 due to gravity. A guiding ramp or any other transfer means may be provided to guide the bale 50 from the baling chamber 14 to the wrapping table 15.

It may be possible that in certain circumstances, for instance in hilly areas, the gravity force is too small to transfer the bale 50 in a proper way from the baling chamber 14 to the wrapping table 15. In such case, an actuation element may be provided to create or stimulate movement of the bale 50 towards the wrapping table 15. When in contrast the gravity force is too large to transfer the bale 50 in a proper way from the baling chamber 14 to the wrapping table 15, a stop or guiding element to inhibit or decelerate movement of the bale 50 may be provided in order to create a proper transfer of the bale 50 from the baling chamber 14 to the wrapping table 14.

When the bale 50 is supported on the wrapping table 15, the wrapping table may be pivoted to the wrapping position, and the wrapping process may be started.

For wrapping a bale 50 of crop material the bale 50 is supported on the wrapping table 15 while the ring 17 with the roll support devices 18 is rotated about the bale 50 in order to wrap the wrapping material on the bale 50. At the same time, the bale 50 is rotated about its cylindrical axis, as indicated by arrows B in FIG. 3, so that different parts of the bale 50 are aligned with the rolls of wrapping material in order to wrap the complete surface of the bale 50 in wrapping material.

After wrapping, the wrapped bale 50 is ready to be released on the ground. To release the bale 50, the wrapping table 15 and the wrapping means 16 may each be pivoted to the release position, as shown in FIG. 4. In the release position of the wrapping table 15, the bale 50 may roll off the wrapping table to the ground. The bale 50 may go through the ring 17 of the wrapping device 3 as the ring 17 has been pivoted together with the wrapping means 16 to the release position.

FIG. 5 shows the agricultural unit ready for transport. When the agricultural unit is not used, it can be brought in the transport position. In the transport position, the baling chamber 14 is closed by placing the rear flap 9 in the closed position. Furthermore, the wrapping means 16 are rotated upwards towards the baling device, and the wrapping table 15 is also pivoted upwards towards the receiving position. The roll support devices 18 are located at locations at opposite sides of the ring 17, so that the roll support devices 18 may be placed partially next to the baling device 14, resulting in a compact transport position.

In this transport position, the total length of the agricultural unit from front end 6 to the rear end of the wrapping device 3 may be smaller than 6 meters in an embodiment configured to form and wrap bales up to bale diameters of 1.6 meters.

Hereinabove a wrapping means 16 has been described comprising a rotatable ring 17 and roll support devices 18. In an alternative embodiment the wrapping means may comprise a stationary guiding ring which is configured to guide the roll supporting devices about the bale 50. Any other suitable type of wrapping means may also be applied. Preferably, a wrapping means is used wherein the devices carrying the wrapping material, for instance roll support devices, form the top side of the wrapping device, i.e. the carrying structure of these devices is located below the devices.

Thus, the invention has been described by reference to certain embodiments discussed above. It will be recognized that these embodiments are susceptible to various modifications and alternative forms well known to those of skill in the art.

Hereinabove, an agricultural unit 1 has been described wherein the baling device 2 and the wrapping device 3 are arranged on a single frame 4. In an alternative embodiment, the baling device 2 and the wrapping device 3 may be arranged at independently supported frames which are coupled to form an agricultural system according to the invention.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An agricultural system comprising:
   a baling device comprising a bale forming mechanism to form a bale including a pivotable rear flap to open a baling chamber in which the bale is formed, and
   a wrapping device to wrap the bale in wrapping material, the wrapping device further comprising: a wrapping table to support the bale during wrapping, and a wrapping mechanism comprising one or more movable parts to be rotated during wrapping along a trajectory around the bale supported on the wrapping table,
   wherein the wrapping device is partially located below the baling device, and wherein the trajectory of the one or more moving parts of the wrapping device and a trajectory of the pivotable rear flap of the baling device are non-overlapping; and
   wherein the trajectory of the one or more moving parts is tilted with respect to a horizontal plane, and wherein a lower part of said trajectory is located at a side directed to the baling device.

2. The agricultural system of claim 1, wherein a part of the trajectory of the one or more moving parts is located below the baling device.

3. The agricultural system of claim 1, wherein the lower part of the trajectory is located below the baling device.

4. The agricultural system of claim 1, wherein the wrapping mechanism comprises one or more roll support devices to support wrapping material rolls, and a carrying structure to carry the one or more roll support devices, wherein the carrying structure is arranged below the one or more roll support devices.

5. The agricultural system of claim 1, wherein the wrapping mechanism comprises a ring carrying one or more roll support devices to support wrapping material rolls.

6. The agricultural system of claim 5, wherein the ring is rotatable about the bale supported on the wrapping table.

7. The agricultural system of claim 5, wherein the ring comprises a guiding rail to guide the roll support devices about the bale supported on the wrapping table.

8. The agricultural system of claim 5, wherein the ring is tilted with respect to a horizontal plane, and wherein a lower part of said ring is located at a side of the baling device.

9. The agricultural system of claim 8, wherein the ring is located below a stationary part of the baling device.

10. The agricultural system of claim 1, wherein the agricultural system comprises a transfer mechanism to transfer the bale from the baling chamber to the wrapping table, wherein the transfer mechanism comprises a guiding slope to guide the bale from the baling chamber to the wrapping device.

11. The agricultural system of claim 10, wherein the transfer mechanism comprises a stop element to inhibit or decelerate movement of the bale on the guiding slope.

12. The agricultural system of claim 10, wherein the transfer mechanism comprises an actuation element to create or stimulate movement of the bale on the guiding slope.

13. The agricultural system of claim 1, wherein the baling device and wrapping device are mounted on a single frame supported by a set of wheels.

\* \* \* \* \*